Dec. 22, 1953

G. E. BEGGS, JR., ET AL 2,663,855

CALIBRATING MEASURING SYSTEM

Filed July 1, 1949

INVENTORS
GEORGE E. BEGGS, JR.
ALFRED W. KOZAK
BY
Woodcock and Phelan
ATTORNEYS

Dec. 22, 1953  G. E. BEGGS, JR., ET AL  2,663,855
CALIBRATING MEASURING SYSTEM
Filed July 1, 1949  3 Sheets-Sheet 2
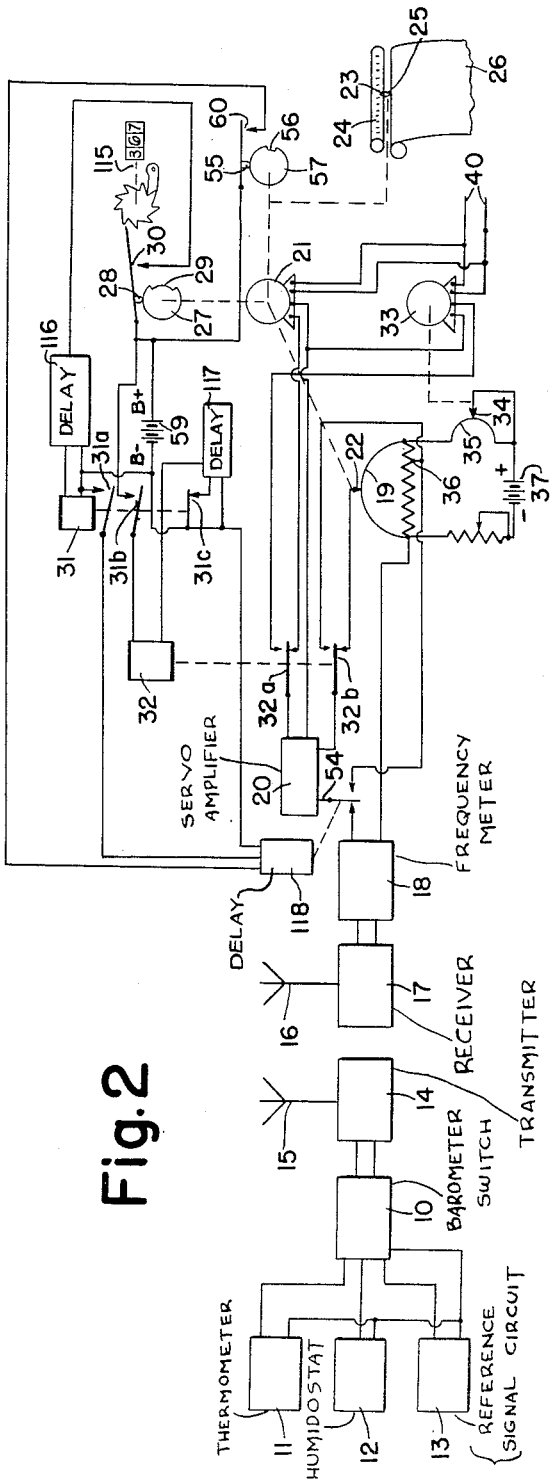
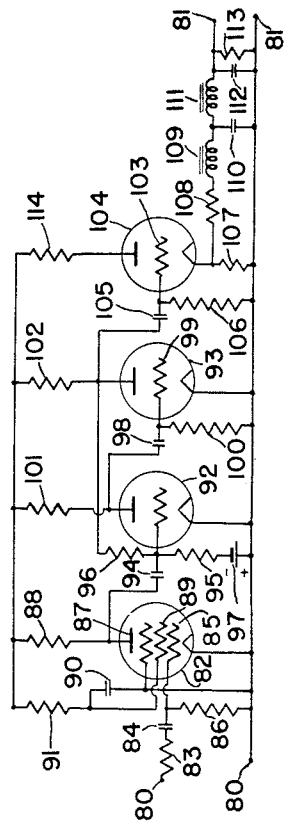
INVENTORS
GEORGE E. BEGGS, JR.
ALFRED W. KOZAK
BY
Woodcock and Phelan
ATTORNEYS

Patented Dec. 22, 1953

2,663,855

UNITED STATES PATENT OFFICE 2,663,855

CALIBRATING MEASURING SYSTEM

George E. Beggs, Jr., Warrington, Pa., and Alfred W. Kozak, Camden, N. J., assignors to Leeds and Northrup Company, Philadelphia, Pa., a corporation of Pennsylvania Application July 1, 1949, Serial No. 102,616

11 Claims. (Cl. 340—178)

This invention relates generally to measuring, indicating, recording, or controlling electrical, physical, chemical, or other conditions, and it relates more particularly to the sequential measuring, indicating, recording, or controlling of a plurality of frequently changing conditions. Certain adjustments of the equipment to eliminate errors are made automatically in response to certain changes in the conditions being measured. The word "measuring" will be used generically hereinafter to include indicating, recording, or controlling.

In general, errors in measurement may be detected and appraised by using the equipment in which the errors occur to measure some known reference quantity. In accordance with the invention, and as an object thereof, the measurement of a reference quantity serves not merely to detect and appraise errors in the measuring equipment but it results in eliminating such errors by the aforesaid adjustment. More specifically certain errors are eliminated by compressing or expanding the range of the indicating or recording apparatus by the amount necessary to eliminate the error when the indication or record is read against its usual fixed scale.

Attempts have heretofore been made to reduce errors in measurement by simultaneously measuring an unknown and a reference quantity with duplicate measuring apparatus. These attempts have not been wholly successful, however, because of changing differences in the duplicate apparatus which sometimes occur due to such causes as the unequal effects of aging of either batteries or electronic tubes. It is deemed preferable to employ a single measuring equipment and to transfer it from a reference quantity to the unknown quantity. This single-equipment system, however, presents several difficulties among which, in addition to the problem of transferring the equipment from one quantity to another, is that of storing during intervals between transfers the error information obtained by measuring the reference quantity. Furthermore, these difficulties are multiplied by the necessity in some cases of measuring quantities which change at random, or on a schedule not known in advance and not within the control of those operating the measuring apparatus. In other words, there can be only a one-way flow of information from the location of the quantity being measured to the measuring apparatus, which automatically must accommodate itself to the different quantities.

An object of the invention is to transfer automatically a single measuring equipment, or portion thereof, alternately from a quantity to be measured to a reference quantity distinguishable therefrom by being outside the expected range of variation of the quantity being measured and, after at least a predetermined time, to transfer the equipment back to the same or another quantity to be measured. A further object of the invention is to store for an unlimited time, until the recurrence of a reference signal outside the aforesaid range of variation of the quantity to be measured, information as to the condition of the measuring equipment gained during the aforesaid predetermined time. The latter object is accomplished in accordance with the invention by adjusting a slidewire, during the aforesaid predetermined time in which a reference quantity is being measured, and leaving this slidewire undisturbed thereafter until another reference quantity is measured.

This invention is particularly applicable where a substantial distance, perhaps spanned by a radio link, intervenes between the quantity, or condition, to be measured and the indicating or recording apparatus. Since, in accordance with the invention, no control is necessary over the sequence of operations at the location of the unknown quantities to be measured, it is only necessary that, from time to time, a standard reference condition shall there be available and that this standard condition be in some respect outside the range of variation of the condition to be measured.

Other objects and advantages of the invention will be apparent from the following more detailed description thereof with reference to the accompanying drawings, in which:

Fig. 1 is a schematic diagram of measuring apparatus embodying the invention;

Fig. 2 is a schematic diagram of the apparatus shown in Fig. 1, certain details thereof being omitted for clearness;

Fig. 4 is a more detailed fragmentary schematic circuit diagram of a portion of the apparatus shown in Fig. 1.

Figure 3:
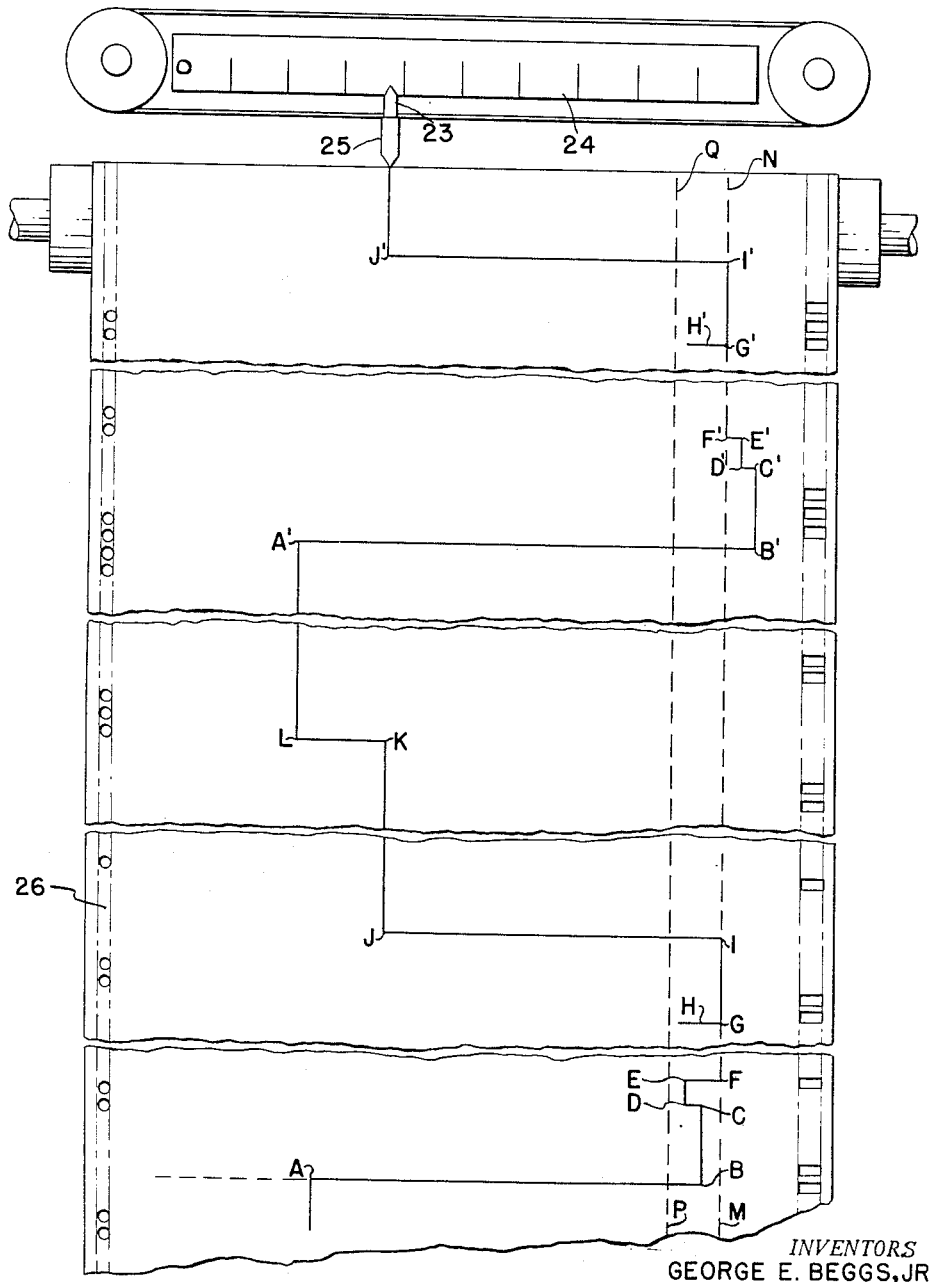
Fig. 3 is a chart useful in explaining the operation of the invention.

The invention may best be described with reference to a typical application thereof. For this purpose a radiosonde system has been chosen wherein accurate measurement is particularly difficult because of the need for extremely light-weight equipment, and because the equipment must remain unattended during the flight of the unmanned balloon.

Referring to Fig. 1, a barometric switch 10, preferably of the aneroid type, is adapted and arranged to connect successively thermometer 11, humidostat 12, and reference signal circuit 13 to transmitter 14, although a different sequence of connections to other measuring devices may be employed if desired. Thermometer 11 has a resistance dependent on the temperature of the air surrounding the thermometer. Humidostat 12 has a resistance dependent on the humidity of the surrounding air. Reference circuit 13 includes a fixed resistance outside the resistance range of thermometer 11 and humidostat 12. Transmitter 14 produces a radio-frequency signal modulated in frequency by the resistance of the device connected to it by barometric switch 10, the frequency-modulated signal being transmitted from antenna 15. Further details of the transmitter-modulator arrangement are contained in Patent No. 2,283,919 to Diamond and Hinman. Other suitable well-known systems for producing a radio-frequency signal modulated in frequency in accordance with the magnitude of the condition to be measured may be employed if desired.

Transmitter 14 may be constructed for modulation over any desired frequency range, but by way of example a range of 8 cycles per second to 200 cycles per second will be assumed and will be referred to for convenience as audio frequencies. The modulation of the transmitter preferably should be substantially linear so that the resultant audio frequency will be a uniform, relative measure of the unknown condition.

It is contemplated that the frequency band from 8 to about 175 cycles per second ordinarily shall be used for measurement, at different times, of temperature, humidity, or other quantity, and that the range from about 175 to 200 cycles per second ordinarily will be reserved for the reference signal which, for example, may be assumed to be 190 cycles per second. This result is achieved by making the fixed resistance of reference circuit 13 outside the resistance range of thermometer 11 and humidostat 12, as mentioned.

In Fig. 3 the line M—N represents the assumed reference signal of 190 cycles per second and the line P—Q represents the nominal dividing frequency of 175 cycles per second between reference signals, above, and measurement signals, below. It will be understood that a reference frequency of 190 cycles is used as a typical example, but that the actual reference frequency may be anywhere within the above-indicated frequency range. Preferably it will be so chosen that the line M—N is at about 95% of the full range of movement of pen 25. Likewise the nominal 175-cycle point at which a switching operation occurs preferably will be so chosen that it, represented by line P—Q, is about 87% of the full range. An important advantage of the invention lies in its ability to change its voltage range to conform to various requirements without physically disturbing the range of pen 25 on paper 26.

The foregoing apparatus, items 10, 11, 12, 13, 14, and 15 may be carried by an unmanned weather balloon, by way of example. As the balloon ascends to some predetermined height at which it is desired to measure temperature, barometric switch 10, having previously been suitably adjusted, connects thermometer 11 to transmitter 14 which results in a signal modulated at a frequency representing the air temperature at the predetermined altitude. Thereafter, when the balloon ascends to a higher altitude at which it is desired to measure humidity, barometric switch 10 connects humidostat 12 to transmitter 14 thereby to transmit a signal whose modulation frequency represents the humidity of the air at this predetermined altitude.

When the balloon ascends to a still higher altitude at which it is desired to calibrate the equipment to prevent subsequent errors in measurement due to changes which may have occurred since the last previous calibration, barometric switch 10 connects reference circuit 13 to transmitter 14, thereby to transmit a reference or calibrating signal. Barometric switch 10 may be adjusted to cause calibration of the equipment at any desired altitude but for convenience it will be assumed that calibration occurs after a humidity measurement and before the next temperature measurement.

The signals transmitted by antenna 15 are received by antenna 16 and converted to audio-frequency signals by receiver 17, which may be of any suitable well-known type. The signals from receiver 17 correspond exactly in frequency to those produced in the balloon by thermometer 11, humidostat 12, or reference generator 13, and they are converted to D.-C. voltages proportional to their frequency by frequency meter 18, described in more detail hereinafter.

In one position of the switching arrangement to be described later, this D.-C. signal is applied to servo amplifier 20 which controls the operation of servomotor 21 to move contact 22 of slidewire 19 to make the voltage of contact 22 equal to that from frequency meter 18. As used herein the word "slidewire" is intended to include any form of impedance having a voltage contact movable relative thereto. With the circuit thus balanced, the position of contact 22 is a measure of the D.-C. voltage output of frequency meter 18 which is a measure of the audio frequency at which transmitter 14 is modulated, and this is a measure of temperature or humidity, or it is the reference signal, depending upon which device is connected to transmitter 14 by barometric switch 10. Pointer 23, driven by motor 21 and therefore moving with contact 22, indicates on scale 24 temperature, humidity, or the reference signal. Pen 25 affixed to pointer 23 records this same reading on the record chart 26 which is moved under pen 25 at a uniform rate by any convenient source of power, not shown.

There has been described in general terms apparatus for measuring and recording temperature or humidity at various predetermined altitudes of a weather balloon. As thus far described these measurements might be subject to considerable error due to changes of barometric pressure, or the temperature of the apparatus, or to other factors, among which variation in battery voltage is most important due to the light-weight low-capacity batteries used in the transmitting equipment employed in small balloons. For example suppose that thermometer 11, humidostat 12, and reference circuit 13 are not in themselves the source of any errors and that the servo system including motor 21 functions perfectly. There remain two principal potential sources of error. First, errors may occur in producing audio-frequency modulation within transmitter 14. Second, errors may occur in converting these audio-frequency voltages to D.-C. voltages in frequency meter 18. In accordance with the invention the voltage of slidewire 19 is varied to eliminate any errors arising in transmitter 14 or frequency meter 18. This elimination of errors depends largely upon the measurement of unknown quantities being subject to substantially the same errors as the measurement of the reference quantity. It follows that the invention in its broader aspects is applicable wherever it is possible to provide such a reference signal, the weather balloon and its radio link being merely a typical example of one application of the invention.

For a more detailed understanding of certain errors to be corrected in accordance with the invention assume that in a temperature of 40° F. thermometer 11 causes transmitter 14 to produce a 100-cycle modulation of the transmitted signal and consequently 100 cycles applied to frequency meter 18 producing, say, a 30-millivolt output therefrom. Now suppose that at a later time a temperature of 40° F. results in the same resistance of thermometer 11 but due to reduced battery voltage in the weather balloon the transmitted signal is modulated at 110 cycles. The result would be a 10% error. Similarly, changes in conditions at the receiver might cause frequency meter 18 to produce 33 millivolts instead of 30 millivolts with a 100-cycle signal applied to it. Errors of the forgoing character can be detected if, from time to time, a known reference quantity is measured.

After the previously described temperature and humidity measurements have been recorded an altitude is reached at which barometric switch 10 connects reference circuit 13 to transmitter 14 whereupon the reference signal is recorded from B to C, Fig. 3, subject to the same errors as the preceding trace. When the change is made from humidostat 12 to reference circuit 13 the modulation frequency of the radiated signal changes from, say, 100 cycles per second to 190 cycles per second. As this modulation frequency passes beyond the upper limit of those frequencies used to represent temperature or humidity, namely 175 cycles per second in the example chosen, motor 21 in following the modulation frequency rotates cam 27 until cam follower 28 drops into slot 29 closing switch 30. The motor 21 continues to move contact 22 to a new position where its voltage will equal that of frequency meter 18 with 190 cycles applied thereto. Slot 29 in cam 27 is sufficiently long and so positioned that follower 28 will remain in it to close switch 30 from about 175 cycles to about 200 cycles corresponding to a reasonable frequency range for the uncorrected reference signal. It will be apparent that the position of follower 28 relative to cam 27 may be varied, by any suitable well-known means, not shown, to vary the range of the reference frequencies, herein considered to be from 175 cycles to 200 cycles for convenience, any where above, below, or within the band of measuring frequencies. If the reference frequencies are thus positioned within the band of measuring frequencies, the width of the former band may be adjusted by varying the width of slot 29 in cam 27.

Referring to Fig. 2, the closing of switch 30 results in the closing of relay 31 after a predetermined time delay during which the 190-cycle reference signal is recorded, as mentioned. This closing of relay 31 closes for a short, predetermined time the relay 32 which, in closing, does two things. First, it connects the output of servo amplifier 20 to servomotor 33 thereby to adjust contact 34 of slidewire 35. Second, it connects the input of amplifier 20 to fixed point 36 whereupon slidewire 35, by varying the voltage applied to slidewire 19 from battery 37, is positioned to make the voltage at point 36 equal to the voltage from frequency meter 18 at the reference frequency of 190 cycles per second. It will be understood that batteries shown and described herein may be replaced, if desired, by any other suitable well-known electric power supply. Thus the voltage at fixed point 36, and at the corresponding point on slidewire 19, has been adjusted by means of a reference voltage to serve as a standard for subsequent measurement of quantities subject to the same errors as the reference voltage thereby eliminating the effects of the errors as described hereinafter. During this adjustment period motor 21 which controls recording pen 25 is inoperative, except for a possible small transient force, and the trace from D to E (or D' to E') Fig. 3, is recorded.

After the aforesaid short, predetermined adjustment period, relay 32 reconnects the output of servo amplifier 20 to servo motor 21, and it reconnects the input of amplifier 20 to contact 22, thereby again to adjust contact 22 to the same voltage as the output of frequency meter 18 which output remains the voltage resulting from the reference frequency. Inasmuch as point 36 has previously been adjusted to this same voltage and the adjustment has not been changed, contact 22 will now be set to a point near the end of slidewire 19 at the same voltage as point 36, and pen 25 will record for an indefinite time the trace between F and G, Fig. 3, this being the corrected reference record differing from the trace B to C by the amount of the correction.

When barometric switch 10 terminates the 190-cycle reference signal and connects thermometer 11 to transmitter 14, air temperature will be measured and recorded in the way previously described, but this measurement and recording of temperature will be done with a corrected voltage supplied to slidewire 19 due to the previously described readjustment of slidewire 35. Inasmuch as slidewire 35 may be left stationary for an indefinite time, thereby retaining the result of the previous measurement of the reference quantity, this slidewire and its associated voltage-supply circuit properly may be referred to as a memory device.

It will be apparent that the above-mentioned adjustment of slidewire 35 serves to eliminate errors in the measurement of temperature or humidity which are also present in the measurement of the reference signal when it is recalled that measurement of temperature and humidity is accomplished by comparing the respective output voltages of frequency meter 18 to the total voltage of slidewire 19. In other words, the output of frequency meter 18 is determined to be a certain fraction of the total voltage of slidewire 19, the fraction being determined by the position of contact 22. This fraction is corrected for the reference signal by adjustment of slidewire 35, as described, and it will therefore be correct for other signals provided slidewire 19 and frequency meter 18 function linearly. Should either slidewire 19 or frequency meter 18 not be linear, second order errors will remain after the correction of primary errors by adjustment of slidewire 35, but the magnitude of such second order errors ordinarily will be small.

As the balloon ascends to higher altitudes barometric switch 10 will connect successively to transmitter 14, humidostat 12, reference generator 13, and thermometer 11 thereby alternately to measure and correct the measuring equipment to eliminate errors in measurement.

As mentioned, after a predetermined time delay the closing of switch 30 actuates relay 31. This time delay is produced as follows, referring to Fig. 1. Closing switch 30 energizes relay 38 by connecting it between the B+ and B− terminals of battery 59. Closing relay 38 energizes motor 39 from any suitable A.-C. power lines 40 thereby rotating shaft 41 and crank 42 affixed thereto against the tension of spring 43 to stop 48. After a predetermined time, as crank 42 reaches stop 48, follower 44 drops into slot 45 of cam 46 affixed to shaft 41 thereby closing switch 47 and connecting relay 31 to battery 59. Subsequently when relay 38 is deenergized by rotation of cam 27 thereby deenergizing motor 39, spring 43 rotates crank 42 backward against stop 48a thereby positioning motor 39 to repeat the time delay when it is reenergized. Other suitable well-known time-delay devices may be employed, if desired.

Energizing relay 31 closes contacts 31b simultaneously supplying B+ voltage to electron tube 49, and to coil of relay 32, thereby energizing relay 32, and opens contacts 31c disconnecting grid 50 of tube 49 from cathode 50a so that capacitor 51 shunted by resistor 52 after a time loses its charge from battery 53 to bias grid 50 to reduce the plate current of tube 49 substantially to zero thereby permitting relay 32 to resume its normal deenergized position. Whenever relay 31 is deenergized grid 50 is connected to cathode 50a charging capacitor 51 from battery 53 making tube 49 ready for further operation but simultaneously removing its B+ voltage to preclude operation until the operating cycle is repeated by reenergizing relay 31. Capacitor 51 and resistor 52 preferably are of such values that relay 32 will remain energized for about three seconds during which time servomotor 33 readjusts contact 34 relative to slidewire 35. Capacitor 51 may be about 1 microfarad and resistor 52 about 3 megohms.

Prior to the aforesaid three-second period the pen 25 has recorded on the chart 26 a trace corresponding to the uncorrected measurement of the reference signal represented, by way of example, by the trace between points B and C in Fig. 3. During the aforesaid three-second period pen 25 may record a somewhat different trace between points D and E in Fig. 3. After the aforesaid three-second period, that is, after relay 32 has resumed the position shown in Fig. 1, pen 25 records the corrected measurement of the reference signal represented between points F and G. This recording of the measurement of the reference signal terminates momentarily, at point G in Fig. 3, when barometric switch 10 disconnects reference circuit 13 from transmitter 14 and reconnects thermometer 11 thereto.

However, it is desired to prolong this record, which may be used for reference purposes in interpreting other portions of the record on the chart 26, for two reasons: First, it is desired to provide a reference reading of adequate duration even if barometric switch 10 operates to terminate the trace between points F and G after only a very brief time. Second, in case the weather balloon temporarily descends slightly, or if for some other reason the reference signal should be interrupted briefly, it is desired to continue recording the reference signal without repeating the sequence of operations which otherwise would be initiated by its momentary disappearance.

To this end, and under circumstances now to be described, the input circuit of amplifier 20 is connected between contact 22 and fixed point 36, at point G in Fig. 3, and left so connected until the reference signal disappears for at least a predetermined time. With this connection the voltage of point 36 will be measured and recorded and, since slidewire 35 had been adjusted to balance the voltage of point 36 and the voltage due to the reference signal, this means that the reference signal record merely will be prolonged.

This prolonging of the reference record is difficult to achieve without spurious responses which would cause confusion in interpreting the record. For example, the uncorrected recording of the reference signal might be too high, as shown between points B' and C', Fig. 3, so that, when corrected, the trace decreases toward the line M—N as at point C' or point E'. It is not desired to initiate the above-mentioned prolonged recording at these decreases, but to initiate it only during the corrected recording of the reference signal as at point G or G'. To distinguish between points C' or E' and points G or G', initiation of the prolonged recording is made to be contingent upon the sequential occurrence of two events, namely, the trace arriving at line M—N, Fig. 3, and thereafter departing from that line. Furthermore, to be effective those two events must occur at some time in the measuring cycle other than when the uncorrected reference signal is being measured; they will not be effective if they occur between points B and C or B' and C'.

To accomplish the aforesaid sequential occurrence of two events cam 57 driven by motor 21 is provided. Its narrow slot 56 is positioned at about the middle of slot 29, relative to the respective followers, so that follower 55 drops into slot 56 closing switch 60 whenever a frequency of 190 cycles is recorded and subsequently leaves the slot whenever the frequency changes slightly from 190 cycles. As described more fully hereinafter, when cam follower 55 is in slot 56 pen 25, which moves with cam 57, is positioned at line M—N, Fig. 3, which for convenience has been assumed to represent 190 cycles. Following is a description of the circuits actuated by this closing and opening of switch 60, the circuits ignoring the closing of switch 60 if the uncorrected reference signal is being measured, but responding to its closing when the corrected reference signal is being measured to prolong the record along the line M—N. Of course, the line M—N ordinarily does not appear on chart 26, but it is convenient for purposes of explanation.

If the uncorrected reference signal is such that pen 25 rises to and beyond line M—N immediately when reference circuit 13 is connected to transmitter 14 by barometric switch 10, as indicated at point B' in Fig. 3, the momentary closing of switch 60 when follower 55 drops into slot 56 will not energize relay 58 because contact 31a of relay 31 will be open and will remain open until point C' is reached after a time determined by timer motor 39 as previously described. Switch 60 will again close after the uncorrected reference signal has been recorded, as at point F' at which time contact 31a will have closed and relay 58 will be energized.

The closing of switch 60 at point F', contact 31a now being closed, results in certain circuit changes preparatory to the subsequent opening of the same switch when the reference signal is terminated by barometric switch 10 at point G'. After the aforesaid preparatory circuit changes, opening switch 60 will accomplish two things. First, by causing relay 64 to be energized it will transfer conductor 54 from the output of frequency meter 18 to fixed point 36 thereby causing servo motor 21 to balance the voltage of contact 22 against that of fixed point 36 and returning pen 25 to the corrected reference signal represented by line M—N. Pen 25 will be returned to line M—N so quickly that its departure and return are represented by a single line H—G or H'—G'. Second, it will start motor 67 which subsequently, at point I', terminates the recording of the corrected reference signal and restores the system to its normal condition to record whatever signal follows the reference signal.

The above mentioned preparatory circuit changes start with the closing of switch 60 at point F' to energize relay 58 through contact 31a, now closed, thereby closing contact 58a and energizing relay 61 through relay 63, which is in its normally closed position. Energizing relay 61 does three things. First, contact 61a in parallel with contact 58a is closed and when once closed it serves to complete the circuit to maintain relay 61 energized even after relay 58 is deenergized to open contact 58a. Second, closing contact 61b prepares relay 64 for being energized when either contact 58d or contact 62b is closed. Third, closing contact 61c prepares motor 67, and relay 62 in parallel therewith, for being energized when either contacts 58c or 62a are closed.

Energizing relay 58 also closes contact 58b to apply B+ voltage to relay 63 through normally closed contact 64a in readiness for the subsequent energizing of relay 63 by electronic tube 65 when the latter is rendered conductive by switch 69 connecting its grid 71 to its cathode 72. Thus relay 63 is energized at point I' to terminate the sequence.

Energizing relay 58 also opens contact 58c. As mentioned, when relay 61 is energized contact 61c closes and would thereby start motor 67 except that contact 58c opens to delay starting of motor 67 until relay 58 is deenergized. Likewise, energizing relay 58 opens contact 58d to delay energizing relay 64 (through contact 61b) until relay 58 is deenergized. This completes the description of the aforesaid preparatory circuit changes in readiness for a description of the deenergizing of relay 58 and the resultant circuit changes.

When the reference signal is terminated by barometric switch 10 at point G' (or point G), motor 31 moves pen 25 downward in an attempt to balance the voltage of contact 22 to the voltage from frequency meter 18 with a signal proportional to temperature applied thereto. This downward movement of pen 25 is accompanied by rotation of cam 57 to open switch 60 and deenergize relay 58. This deenergizing of relay 58 results in the immediate interruption of the downward movement of pen 25 since, with the circuits prepared as above described, deenergizing relay 58 results in energizing relay 64 to cause motor 21 to balance the voltage of contact 22 against that of fixed point 36 thereby moving pen 25 back to the line M—N in Fig. 3, closing switch 60 to reenergize relay 58.

The aforesaid deenergizing of relay 58 starts motor 67 thereby to terminate the sequence, after a predetermined time, as follows: Deenergizing relay 58 closes contact 58c thereby connecting relay 62 and motor 67 to power line 40. This closes contact 62a which is in parallel with contact 58c and maintains operation of motor 67 by keeping relay 62 energized despite the above-mentioned prompt reenergizing of relay 58 at point G'. Energizing relay 62 also closes contact 62b in parallel with contact 58d to maintain relay 64 energized even when relay 58 is reenergized.

Motor 67 continues to rotate shaft 73 and cam 68 affixed thereto until crank 74 carried by shaft 73 meets stop 75 thereby stalling motor 67. This rotation of cam 68 throws switch 69 thereby doing two things. First, it deenergizes relay 64 by opening its return circuit including contacts 62b and 61b. The result of deenergizing relay 64 depends upon the signal then being applied to frequency meter 18. If barometric switch 10 should cause the reference signal again to be applied to frequency meter 18 during the interval between point G' and I' and to remain so applied until after point I', motor 21 will remain stationary and switch 69 will remain closed until another termination of the reference signal whereupon follower 55 leaving slot 56 in cam 57 opens switch 60 to repeat the cycle of operations that prolong the recording of the reference signal. However, if a lower-frequency, temperature signal, for example, is being applied to frequency meter 18 when relay 64 is deenergized, motor 21 will move contact 22 downward thereby opening switch 69. This opening of switch 69 immediately after relay 64 has been deenergized, makes the circuit ready for normal operation to measure and record whatever signal follows the reference signal as described more fully hereinafter.

The second effect of throwing switch 69 at point I' is immediately to energize relay 63 by connecting grid 71 to cathode 72 of electronic tube 65, and this takes place whether or not a reference signal is present. Energizing relay 63 deenergizes relay 61 to open contact 61c to deenergize motor 67 and relay 62 whereupon spring 79 rotates motor 67 backward until crank 74 meets stop 76 thus restoring the motor to its initial condition.

This backward rotation of motor 67 by spring 79 results in the immediate actuation of switch 69 to disconnect grid 71 from cathode 72. If this disconnection were allowed immediately to bias tube 65 sufficiently to deenergize relay 63 thereby to energize relay 61 before motor 21 had time to open switch 60, energizing relay 61 would again start motor 67 to repeat the sequence over and over. To make sure that relay 63 remains energized long enough for switch 60 to open to terminate the sequence, capacitor 78 is so arranged that it must be charged through resistor 79 from battery 77 to bias grid 71 sufficiently negative to render tube 65 sufficiently nonconductive to deenergize relay 63. Resistor 79 may be about 250,000 ohms and capacitor 78 about ½ microfarad.

Referring to Fig. 4 for a more detailed description of frequency meter 18, a sinusoidal voltage from receiver 17 is applied to input terminals 80 and a D.-C. voltage proportional in amplitude to the frequency of this input voltage is produced at output terminals 81. First, electronic tube 82 converts the sinusoidal voltage at terminals 80 to a substantially square wave as follows. Resistor 83 limits the amplitude of the positive lobes of the sine wave applied through capacitor 84 to grid 85 across grid leak 86. A B+ voltage of around 200 volts from any suitable D.-C. source is, in the absence of a signal at grid 85, reduced to about 10 volts at plat 87 by resistor 88. Screen grid 89, by-passed by capacitor 90, also normally is at about 10 volts supplied from B+ through resistor 91. The negative lobe of the sine-wave voltage at terminal 80 drives grid 85 far beyond the plate-current cutoff point so that only the middle portion of the sine wave appears in amplified form at plate 87, and this middle portion is substantially a square wave.

Electronic tubes 92 and 93 form a multivibrator circuit of a type which restores itself automatically in a predetermined time after being triggered by a voltage applied to one of its electrodes. The square-wave voltage from plate 87 is differentiated by capacitor 94 and resistor 95 resulting in two short pulses for each cycle, one of positive polarity and the other of negative polarity. Depending upon the values of resistor 95 and of resistor 96 and battery 97, pulses of one polarity, but not both, will cause tube 92 to change its conductivity from full to substantially zero conductivity. Simultaneously the conductivity of tube 93 will be changed oppositely by a pulse passed through capacitor 98 to grid 99 across resistor 100. After being triggered by a pulse from plate 87, the conductivity of tube 92 resumes its normal condition after a short period of time determined for the most part by the values of capacitor 98 and resistor 100. Capacitor 98 may be about 0.0001 mfd. and resistor 100 about 1 megohm. The varying voltage across resistor 101 is transmitted to grid 99 through capacitor 98 and the oppositely varying voltage across resistor 102 is transmitted across resistor 106 to grid 103 of electronic tube 104 through capacitor 105. Resistor 114 decreases the B+ voltage to an appropriate value for tube 104.

Thus the multivibrator including electronic tubes 92 and 93 produces pulses all having the same predetermined duration, one pulse being produced for each cycle of the voltage applied to terminals 80. These pulses appear across cathode resistor 107 and are averaged in the circuit comprising resistor 108, reactor 109, capacitor 110, reactor 111, capacitor 112, and resistor 113. Thus by averaging pulses of a predetermined length occurring at the same frequency as the signal to be measured, there is produced at terminal 81 a D.-C. voltage proportional to the frequency of the signal applied to the terminals 80.

It is unnecessary to give typical values for all of the circuit components associated with tubes 82, 92, and 93 since, in accordance with the invention, these circuits are used in well-known ways for well-known purposes. It is desired that the output voltage at terminals 81 shall be as nearly as possible a linear function of the frequency of the voltage applied to terminals 80. With 100 microsecond pulses produced by the multi-vibrator including tubes 92 and 93, and with audio frequencies in the range used herein by way of example, the following values of output-circuit components are preferred.

| | |
|---|---|
| Resistor 107 | 5,000 ohms. |
| Resistor 108 | 500 ohms. |
| Reactor 109 | 150 henries. |
| Capacitor 110 | 16 mfd. |
| Reactor 111 | 150 henries. |
| Capacitor 112 | 8 mfd. |
| Resistor 113 | 5,000 ohms. |

There has been described apparatus for successively measuring temperature, humidity, and a calibrating signal. In as much as these successive operations occur at predetermined altitudes, determined by barometric switch 10, it is apparent that each change from one operation to another is an indication of the altitude of the balloon at the time the change is made. To indicate and record the altitudes at which calibration occurs counter 115, which may be any suitable well-known type such as a Veeder counter, is activated by cam follower 28.

There has also been described a cam-and-follower arrangement (cam 27 and follower 28) for initiating recalibration of the measuring equipment whenever cam 27 and slidewire 19 reaches a predetermined signal from the quantities being measured. In other words, recalibration is initiated whenever a voltage (say, that from frequency meter 18) reaches a predetermined value. It will be apparent to one skilled in the measuring art that, instead of the cam and follower arrangement, an electronic circuit responsive to a predetermined voltage to actuate relay 38 might be provided to achieve the desired result of automatic recalibration in a circuit in which signals proceed from the location of the quantities being measured to the indicating or recording apparatus, but not in the reverse direction.

It will be understood that as used herein the expression "servo system" includes a system in which a servo amplifier, such as amplifier 29, may operate with either of two servomotors, such as motor 21 or motor 33, together with necessary feed-back circuit.

While a preferred embodiment of the invention has been shown and described it is understood modifications thereof may be made within the spirit and scope of the appended claims.

What is claimed is:

1. In combination, a conversion system for producing electrical signals having magnitudes representative of the magnitudes of a plurality of predetermined conditions, said system including a controller for producing a succession of said signals in predetermined sequence which are respectively representative of said plurality of conditions, a balanceable network including a calibration slidewire and associated contact relatively adjustable with respect to each other and a measuring slidewire and associated contact relatively adjustable with respect to each other, a servo system including a selector switch for selective relative adjustment between said calibration slidewire and its associated contact and between said measuring slidewire and its associated contact, said network having an input circuit for application thereto of said electrical signals from said conversion system, means operable upon application to said balanceable network of a signal representative of a selected one of said conditions for operating said selector switch for relative adjustment between said calibration slidewire and its contact by said servo system to balance said network, said selector switch subsequently being operable to connect said servo system for adjustment of said measuring slidewire relative to its contact to rebalance said network.

2. In apparatus for measuring unknown quantities in relation to a reference quantity having similar characteristics and being subject to similar measuring errors, the combination which comprises a conversion system for producing a signal voltage representative of a selected one of said quantities, the signal voltage from said reference quantity differing from the signal voltages from said unknown quantities, said conversion system being operable at different times to produce signal voltages representative of both unknown quantities and said reference quantity;

and a balanceable network including a measuring slidewire and a voltage supply therefor, a calibration slidewire for varying the voltage from said supply to reduce said errors, and a servo system for selectively adjusting said measuring slidewire in response to said signal voltages; said balanceable network comprising a voltage-sensitive selector system operable in response to said reference-quantity signal voltages to connect said servo system for adjustment of said calibration slidewire, said selector system being operable in response to said unknown-quantity signal voltages to connect said servo system for adjustment of said measuring slidewire in measurement of said unknown quantities.

3. In apparatus for measuring an unknown quantity in relation to a reference quantity having similar characteristics and being subject to similar measuring errors, the combination which comprises a conversion system for producing a signal voltage representative of a selected one of said quantities, the signal voltage from said reference quantity differing from the signal voltage from said unknown quantity, said conversion system being operable at different times to produce signal voltages representative of both said unknown quantity and said reference quantity; and a balanceable network including a measuring slidewire and a voltage supply therefor, a calibration slidewire for varying the voltage from said supply to reduce said errors, and a servo system for selectively adjusting said measuring slidewire in response to said signal voltages; said balanceable network comprising a voltage-sensitive selector system operable in response to said reference-quantity signal voltage to connect said servo system for adjustment of said calibration slidewire, said selector system being operable in response to said unknown-quantity signal voltage to connect said servo system for adjustment of said measuring slidewire in measurement of said unknown quantity.

4. In combination, a balanceable network including a calibration slidewire relatively adjustable with respect to its associated contact and a measuring slidewire relatively adjustable with respect to its associated contact, a servo system including a selector device for selectively adjusting relatively said slidewires and associated contacts and in normal position connecting said servo system for adjustment of said measuring slidewire, said network having an input circuit for receiving signals of a predetermined character representative of the magnitude of a condition under measurement, and means operable upon the application to said network of a signal resulting in the movement of the measuring slidewire to a predetermined position for operating said selector device for transfer of control of said servo system to said calibration slidewire for relative adjustment thereof to balance the network.

5. In a measuring system including a balanceable network having as one circuit component a calibrating impedance and as a second circuit component a measuring impedance and means for selectively adjusting one of said impedances to rebalance the network, the combination therewith of a selector system for changing the connection of said adjusting means first to one and then to the other of said impedances, and means for controlling the operation of said selector system operable upon the application to said balanceable network of a signal of predetermined magnitude for shifting the connection of said adjusting means from one of said impedances to the other of said impedances.

6. In an apparatus for measuring unknown quantities in relation to reference quantities having similar characteristics and being subject to similar measuring errors, a conversion system for producing a signal voltage representative of a selected one of various quantities, the signal voltages from said reference quantities differing from the signal voltages from said unknown quantities, said conversion system being operable at different times to produce signal voltages representative of said unknown quantities and of said reference quantities, the combination of a balanceable network including a measuring impedance, a voltage supply therefor, and a calibrating impedance for varying the voltage from said supply to reduce said measuring errors, said network including a servo system for selective adjustment of said impedances, a selector system for connecting said servo system to one of said impedances, and means responsive to a signal voltage of predetermined character for changing the connection of said servo system from one of said impedances to the other of said impedances in avoidance of said errors in the measurement of said unknown quantities.

7. In an apparatus for measuring unknown quantities in relation to reference quantities having similar characteristics and being subject to similar measuring errors, a conversion system for producing a signal voltage representative of a selected one of various quantities, the signal voltages from said reference quantities differing from the signal voltages from said unknown quantities, said conversion system being operable at different times to produce signal voltages representative of said unknown quantities and of said reference quantities, the combination of a balanceable network including a measuring impedance, voltage supply therefor, and a calibration impedance for varying the voltage from said supply to reduce said measuring errors, said network including a servo system for selective adjustment of said impedances, a selector system for connecting said servo system to one of said impedances, and means responsive to a signal voltage outside the normal range of signal voltages from said unknown quantities for changing the connection of said servo system from one of said impedances to the other of said impedances in avoidance of said errors in the measurement of said unknown quantities.

8. A radiosonde measuring system comprising a meteorological measuring unit, a reference unit, a radio transmitter, a barometric switch for connecting said units successively to said transmitter at predetermined altitudes of said switch, a radio receiver for receiving signals from said transmitter, the output of said receiver being a voltage varying with the magnitude of the said quantity being measured, a measuring slidewire and associated contact and a voltage supply therefor, a calibrating slidewire and associated contact for varying the voltage from said voltage supply, a voltage divider connected across said measuring slidewire, a servo system including an amplifier and a switching arrangement therefor, said switching arrangement in one position thereof connecting said measuring slidewire and said receiver output in series opposition across an input circuit of said amplifier and connecting the output of said amplifier to cause said servo system to adjust relatively said measuring slidewire and its associated contact to make the voltage of the latter equal to said receiver output, said switching arrangement in another position thereof connecting said receiver output and the output of said voltage divider in series opposition across said input circuit of said amplifier and connecting the output of said amplifier to cause said servo system to adjust relatively said calibrating slidewire and its associated contact to make the voltage of said output of said voltage divider equal to said receiver output, a cam movable with said contact associated with said measuring slidewire for shifting said switching arrangement from said first-named position thereof to said second-named position thereof at a predetermined relative position of said measuring slidewire and its associated contact, and a cumulative indicator operatively connected to said cam for recording successive operations of said barometric switch thereby indicating in discrete steps the altitude of said barometric switch.

9. A radiosonde measuring system comprising a meteorological measuring unit, a reference unit, a radio transmitter, a barometric switch for connecting said units successively to said transmitter at predetermined altitudes of said switch, a radio receiver for receiving signals from said transmitter, the output of said receiver being a voltage varying with the magnitude of said quantity being measured, a measuring slidewire and associated contact and a voltage supply therefor, a calibrating slidewire and associated contact for varying the voltage from said voltage supply, a voltage divider connected across said measuring slidewire, a servo system including an amplifier and a switching arrangement therefor, said switching arrangement in one position thereof connecting said measuring slidewire and said receiver output in series opposition across an input circuit of said amplifier and connecting the output of said amplifier to cause said servo system to adjust relatively said measuring slidewire and its associated contact to make the voltage of the latter equal to said receiver output, said switching arrangement in another position thereof connecting said receiver output and the output of said voltage divider in series opposition across said input circuit of said amplifier and connecting the output of said amplifier to cause said servo system to adjust relatively said calibrating slidewire and its associated contact to make the voltage of said output of said voltage divider equal to said receiver output, said switching arrangement in a third position thereof connecting said measuring slidewire contact and said output of said voltage divider in series opposition across said input of said amplifier and connecting the output of said amplifier to cause said servo system to adjust relatively said measuring slidewire and its associated contact to make the voltage of the latter equal to the voltage of said output of said voltage divider, a cam movable with said contact associated with said measuring slidewire for shifting for a predetermined time said switching arrangement from said first-named position thereof to said second-named position thereof at a predetermined relative position of said measuring slidewire and its associated contact, said switching arrangement after said predetermined time automatically returning to its said first-named position subject to being immediately reshifted to its second-named position if said contact is then in said predetermined relative position, and a second cam movable with said contact of said measuring slidewire for shifting said switching arrangement to said third-named position upon the occurrence of a predetermined sequence of relative movements of said measuring slidewire and its associated contact.

10. A radiosonde measuring system comprising a plurality of meteorological measuring units, a reference unit, a radio transmitter, a barometric switch for connecting said units successively to said transmitter at predetermined altitudes of said switch, a radio receiver for receiving signals from said transmitter, the output of said receiver being a voltage varying with the magnitude of the said quantity being measured, a measuring slidewire and associated contact and a voltage supply therefor, a calibrating slidewire and associated contact for varying the voltage from said voltage supply, a voltage divider connected across said measuring slidewire, a servo system including an amplifier and a switching arrangement therefor, said switching arrangement in one position thereof connecting said measuring slidewire and said receiver output in series opposition across an input circuit of said amplifier and connecting the output of said amplifier to cause said servo system to adjust relatively said measuring slidewire and its associated contact to make the voltage of the latter equal to said receiver output, said switching arrangement in another position thereof connecting said receiver output and the output of said voltage divider in series opposition across said input circuit of said amplifier and connecting the output of said amplifier to cause said servo system to adjust relatively said calibrating slidewire and its associated contact to make the voltage of said output of said voltage divider equal to said receiver output, said switching arrangement in a third position thereof connecting said measuring slidewire contact and said output of said voltage divider in series opposition across said input of said amplifier and connecting the output of said amplifier to cause said servo system to adjust relatively said measuring slidewire and its associated contact to make the voltage of the latter equal to the voltage of said output of said voltage divider, a cam movable with said contact associated with said measuring slidewire for shifting for a predetermined time said switching arrangement from said first-named position thereof to said second-named position thereof at a predetermined relative position of said measuring slidwire and its associated contact, said switching arrangement after said predetermined time automatically returning to its said first-named position subject to being immediately reshifted to its second-named position if said contact is then in said predetermined relative position, a second cam movable with said contact associated with said measuring slidewire for shifting said switching arrangement to said third-named position upon the occurrence of a predetermined sequence of relative movements of said measuring slidewire and its associated contact, and a cumulative indicator operatively connected to said first-named cam for recording successive operations of said barometric switch thereby indicating in discrete steps the altitude of said barometric switch.

11. A measuring system comprising a balanceable network including a measuring slidewire, a calibration slidewire connected in circuit with said measuring slidewire, circuit-controlling means for applying to said network at least one signal varying with the magnitude of a condition for unbalancing said network, means responsive to the unbalance of said network for adjusting said measuring slidewire in a direction and to an extent sufficient to rebalance said network, actuating means for said circuit-controlling means operable upon substantially full-range relative movement between said measuring slidewire and its associated contact for connecting said rebalancing means between the applied signal and a fixed voltage point with respect to said measuring slidewire, and means responsive to the unbalance of said network for adjusting said calibration slidewire in a direction and to an extent to vary the potential of said point to rebalance the network thereby to provide a standardizing operation with respect to said signal which produced said substantially full-range movement of said measuring slidewire.

GEORGE E. BEGGS, Jr.
ALFRED W. KOZAK.

References Cited in the file of this patent

UNITED STATES PATENTS

| Number | Name | Date |
| --- | --- | --- |
| 683,831 | Arcioni | Oct. 1, 1901 |
| 2,076,499 | Grant | Apr. 6, 1937 |
| 2,368,912 | Barnes | Feb. 6, 1945 |
| 2,404,891 | Schmitt | July 30, 1946 |
| 2,418,836 | Hawes | Apr. 15, 1947 |
| 2,424,146 | Caldwell et al. | July 15, 1947 |
| 2,446,153 | Belcher | July 27, 1948 |
| 2,451,953 | Ingram | Oct. 19, 1948 |
| 2,529,729 | Hanson | Nov. 14, 1950 |
| 2,577,735 | Broomell, Jr. | Dec. 11, 1951 |